Feb. 23, 1932.  W. KADER  1,846,559

FEEDING DEVICE ON AUTOMATIC WEIGHING MACHINES

Filed Feb. 13, 1930  3 Sheets-Sheet 1

Inventor:-
Wilhelm Kader
By
Langner, Parry, Card & Langner
Attorney

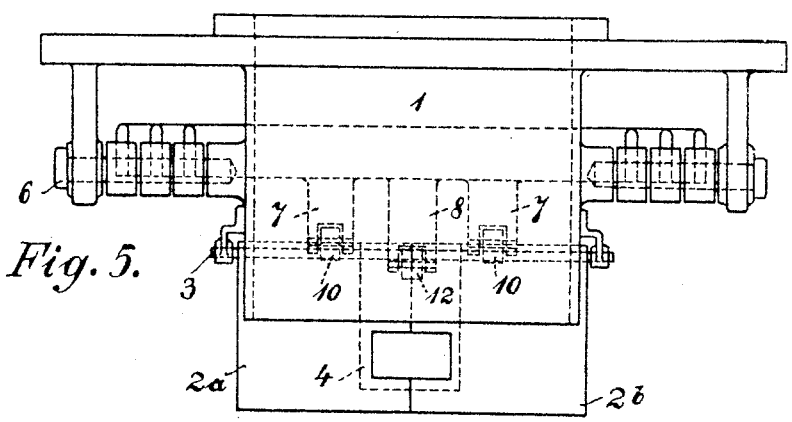
Fig. 5.
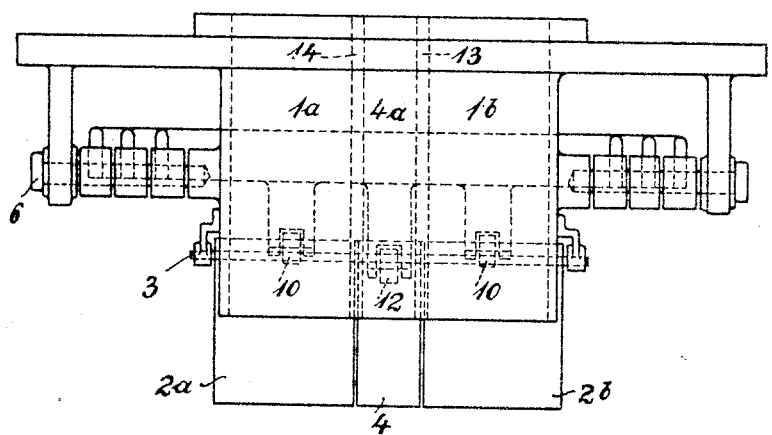
Fig. 6.
Fig. 7.
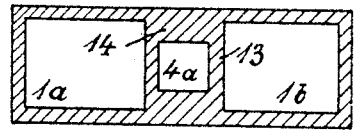

Fig. 5.a

Inventor
Wilhelm Kader
By
E. L. ~~~~
Attorney

Patented Feb. 23, 1932

1,846,559

UNITED STATES PATENT OFFICE

WILHELM KADER, OF WARTH, NEAR HENNEF-ON-THE-SIEG, GERMANY, ASSIGNOR TO FIRM HENNEFER MASCHINENFABRIK C. REUTHER & REISERT MIT BESCHRÄNKTER HAFTUNG, OF HENNEF-ON-THE-SIEG, GERMANY

FEEDING DEVICE ON AUTOMATIC WEIGHING MACHINES

Application filed February 13, 1930, Serial No. 428,228, and in Germany January 7, 1930.

In weighing fine powdery, easily flowing material which frequently enters the weighing scale or weighing receptacle in a hot state, there is the drawback that it is not possible with the heretofore known valves or closing members to secure a good tight closure of the feeding funnel. The feeding flaps swinging below past the feed funnel must be arranged to allow a sufficient play to prevent impediment of operation. Naturally a leaky closure of the feed funnel results with fine powdery material. By the present invention a tight closure of the feed members is secured even for very fine powdery substances.

According to the present invention the device is so constructed that the valve or closure members do not swing past the feed funnel below the same, but they are pressed from below towards or up against the lower rim of the feed funnel or against one another, thus tightly closing the feed funnel.

The lower edge of the feed funnel is preferably provided with a strip of elastic material, which is so arranged, that it does not directly contact with the material flowing downwardly, and therefore, it is scarcely liable to wear. This arrangement may be employed for gross- or brutto-scales as well as for net-scales.

Reference is had to the accompanying drawings in which the invention is illustrated by way of example.

Figs. 5 and 5a are front views of a modification of the scale, in which the closure members for gross filling consists of two sections side by side each having a part for a dribble stream, and showing two different locations of the opening for the dribble stream.

Fig. 6 is the front view of another modification in which two channels are used for the gross stream, and a special channel for the fine or dribble stream.

Fig. 7 is the cross section of the lower part of the feed funnel.

Figure 1:
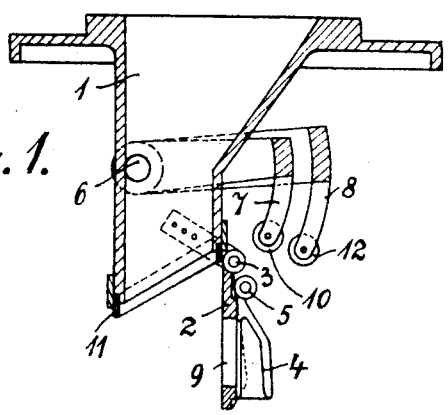
Figs. 1, 2 and 3 illustrate a sectional view of the scale in three different positions.
Figure 2:
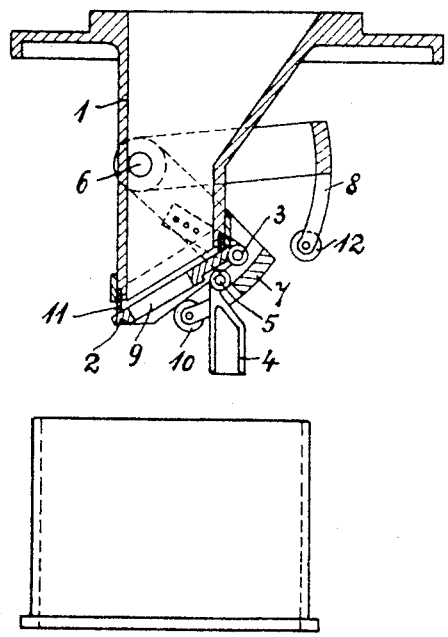

To the feed funnel 1 a closure member 2 is pivoted by the spindle 3 for cutting off the main stream so that, on giving way, the closure member is out of reach of the stream. The auxiliary closure member 4, which is adapted to cut off the fine or dribble feed (Figs. 1–4) is rotatably journaled about a stud 5 on the closure member 2 (the member closing the dribble stream may be arranged between or beside the member 2 adapted to close the main stream, Figs. 5 and 6).

Catch or drop arms 7 and 8, which are arranged to oscillate about an axis 6, are provided at their free ends with rollers 10 and 12 respectively, and held back during the weighing operation by a stop not shown.

Figure 3:
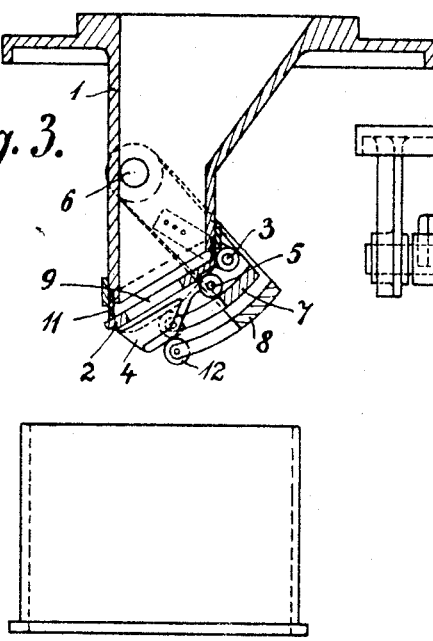
Figure 4:
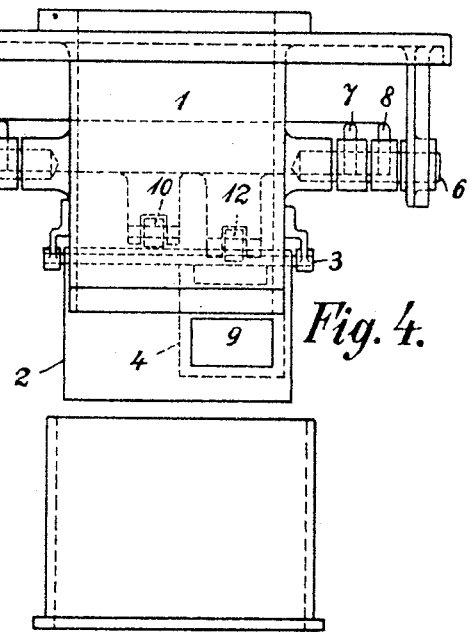
Fig. 4 is the front view of the scale.

The operation of the feeding device is as follows: At first the drop arms 7 and 8 are moved into the open position Fig. 1 held in this position by any suitable well known means, not shown. The closure members 2 and 4 hang down in the manner shown in Fig. 1. When the scale pan or the receptacle, or the sack attached to the usual sack carrying means is filled to a certain extent by the scale pan the drop arm 7 is released from its hold. Thus the drop arm 7 swings down and catches and presses by the roller 10 against the member 2, which engages and presses with a certain force against the elastic strip 11 mounted on the edge of the funnel outlet. The main filling is thus secured. Thereupon the material now flows only through the opening 9 in the closing member 2. By the fact that the member 2 is provided with this opening 9 for the dribble, the power necessary for closing this member is reduced, because the material moving downwardly and pressing on the surface of the member 2 may pass before the complete closure between the edges as well as through the opening 9. As soon as the scale is balanced the second drop arm 8 is released from its holding member by the operation of the scale, so that the arm 8 drops down and catches and presses against the closure member 4 by the roller 12, which now firmly presses against the closure member 2. The feed of the material is now fully and tightly cut off (Fig. 3). By the fact, that the running faces on the closure members for the rolls 10 and 12 are inclined, a particularly firm pressing is secured by the members 7 and 8 against the closure members 2 and 4, which thus press against the tightening strip 11 or firmly against one another respectively.

Weighing machines having no dribble filling need only be provided with one closure member.

In the construction shown in Fig. 5 two main closure members $2a$ and $2b$ instead of one single main closure member are provided for the main stream, which members are so arranged, that after the gross weighing is accomplished they may cut off the main stream either both at the same time or one after the other.

The two main closure members $2a$ and $2b$ may have each one half of the opening 9 in such manner that the two members combined form a single opening in the center of the feed funnel, when they are in closure position. This by-pass-opening, of course, could also be arranged laterally on one (or a plurality of a) gross stream closure member, as is indicated in Fig. 5 by dotted lines.

In the construction shown in Fig. 6 there are also two closure members $2a$ and $2b$ for the main filling, each of which, however, is adapted to close a special channel $1a$ and $1b$ respectively. By arranging two or more gross stream channels the advantage is gained, that the column of material is distributed on the divers closure members according to the number of channels. Thus the inconvenient overloading by the total amount of material is avoided. The closure member 4 in this instance is arranged in the center between the two channels $1a$ and $1b$ for the gross stream and shut off the fine or dribble stream channel $4a$. The fine stream channel $4a$, of course may be arranged laterally. The number of fine stream channels depends, of course, on the size of the weighing machine.

In some cases, when the condition of the material changes, or when the amount of the feed of the material changes, it may be of advantage to increase the height of the dividing stays, which are provided on the lower part of the feed funnel upwardly to form dividing partitions 13 and 14, even to such extent as to become flush with the upper rim of the feed funnel.

The closure members 2 and 4 instead of being arranged on the feed funnel may be arranged correspondingly on the frame of the weighing machine.

Figure 8:
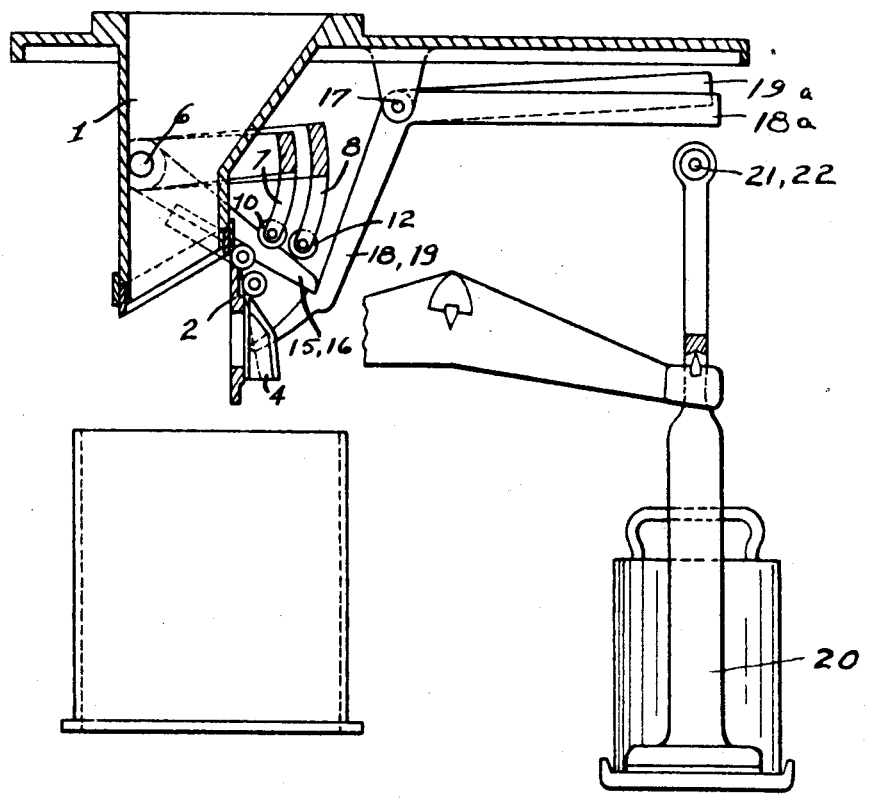
Fig. 8 is a view partly in elevation and partly in vertical section of the mechanism, showing the fine dribble controlling mechanism.
Figure 8:
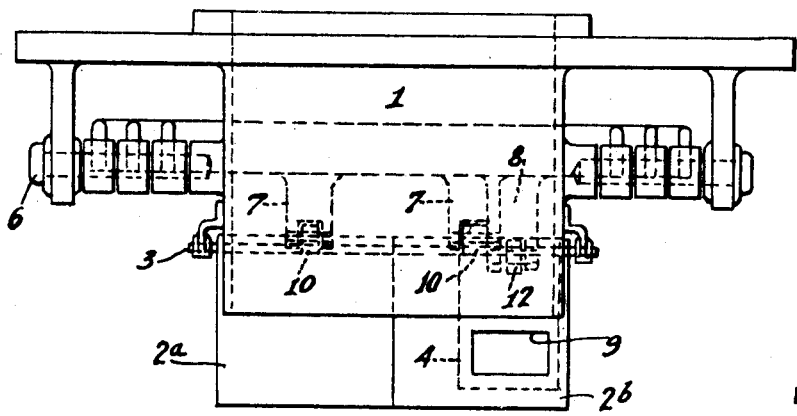

As shown in Fig. 8 the drop arms 7 and 8 are arranged to oscillate about the axis 6 on both sides of the funnel 1, and on the same axis on each side is pivoted an arm 15, 16, respectively, connected with the drop arms 7 and 8. Moreover on both sides with regard to the funnel 1 two locking levers 18 and 19 are journaled on bolts 17 adapted to engage the arms 15 and 16 in open position of the drop arms. On the upper part of the weight pan 20 bolts 21 and 22 are mounted on both sides adapted to effect the operation of the locking levers 18 and 19. The release of the dropping arms 7 and 8 by the operation of the weighing machine is carried out as follows:

While the gross weighing is carried on the scales are set in motion, the weighing pan 20 moving upwardly, and finally the bolt 21 catches below the arm $18^a$ of the locking lever 18, thus releasing the arm 15 which engages the drop arm 7 so that this drop arm drops down to allow the gross flap 2 to be pressed into closing position. Thereupon the dribble feed is carried on, and the weighing scales move further on until the weight pan 20 is moved upwardly to such an extent that the bolt 22 engages the arm $19^a$ of the locking lever 19, whereby the arm 16 holding the drop arm 8 is released so that the drop arm engages the flap 4 and presses it against the opening in the flap 2. Thus it will be seen that the release of the drop arms is effected by the operation of the weighing machine, that is to say, by the upward movement of the weighing pan.

I claim:—

1. A feeding device on automatic weighing machines for weighing fine powdery material comprising a feed funnel, closure means pivoted below the feed funnel and adapted to be pressed against the edge of the outlet opening of the feed funnel, the closure means consisting of two closure members each provided with an opening on the inner side, the openings of the two members forming a single opening in closed position of the closure members, an auxiliary closure member adapted to be pressed against the main closure member for closing the opening in the said main closure member.

2. A feeding device on automatic weighing machines for fine powdery material, comprising a feed funnel, closure means pivoted under the said feed tunnel, and a drop arm normally held in position and adapted to be released by the operation of the weighing machine to engage the said closure means, thereby pressing the same against the edge of the outlet opening of the said feed funnel.

3. A feeding device for automatic weighing machines for fine powdery material, comprising a feed funnel, closure means pivoted under the feed funnel, a drop arm normally held in a raised position and adapted to be released by the operation of the weighing machine to engage the said closure means, thereby pressing the same against the edge of the outlet opening of the said feed funnel, an auxiliary closure member, the said main closure means having an opening therein adapted to be closed by the said auxiliary closure member, and an auxiliary drop arm normally held in a raised position and also adapted to be released by the operation of the weighing machine after the release of the main drop arm, the main drop arm closing the gross feed, and the auxiliary drop arm effecting the closure of the dribble feed.

4. A feeding device on automatic weighing machines for weighing fine powdery material, comprising a feed funnel, a flap for closing the end of said funnel, means to press said flap upwards against the edge of the funnel, an opening in said flap, a second flap journaled on the first named flap, and adapted to close its opening, and means independent from the means to close the first named flap, to press the second named flap against the first named flap.

In testimony whereof I have signed my name to this specification.

WILHELM KADER.